United States Patent [19]

Takahashi

[11] Patent Number: 5,625,272

[45] Date of Patent: Apr. 29, 1997

[54] BATTERY CHARGE/DISCHARGE CONTROL METHOD FOR ELECTRIC VEHICLE

[75] Inventor: Tsutomu Takahashi, Oota, Japan

[73] Assignee: Fuji Jukogyo Kabushiki Kaisha, Tokyo, Japan

[21] Appl. No.: 556,844

[22] Filed: Nov. 2, 1995

[30] Foreign Application Priority Data

Nov. 9, 1994 [JP] Japan .................................... 6-275346

[51] Int. Cl.$^6$ ................................................. H01M 10/44
[52] U.S. Cl. ................... 320/6; 320/17; 320/19; 320/35; 320/39
[58] Field of Search .................... 320/5, 6, 15, 17, 320/19, 35, 39

[56] References Cited

U.S. PATENT DOCUMENTS

| | | | |
|---|---|---|---|
| 3,997,830 | 12/1976 | Newell et al. | 320/5 |
| 5,352,968 | 10/1994 | Reni et al. | 320/35 |
| 5,387,857 | 2/1995 | Honda et al. | 320/17 X |
| 5,469,042 | 11/1995 | Rühling | 320/17 |
| 5,557,189 | 9/1996 | Suzuki et al. | 320/18 |

*Primary Examiner*—Peter S. Wong
*Assistant Examiner*—Patrick B. Law
*Attorney, Agent, or Firm*—Beveridge, DeGrandi, Weilacher & Young, L.L.P.

[57] ABSTRACT

A method of controlling charge or discharge of a battery for an electric vehicle comprises the steps of, dividing a battery into a plurality of blocks each composed of a plurality of cells for constituting the battery in all, detecting terminal voltages ($V_n$) of the divided blocks, respectively to obtain a difference ($V_{max}-V_{min}$) in voltage between a maximum value and a minimum value from among the detected terminal voltages of the respective divided blocks, and controlling the charge or discharge of the battery on the basis of the obtained difference in voltage between the maximum and minimum values of the terminal voltages of the divided blocks. In practice, when the voltage difference ($V_{max}-V_{min}$) between the maximum value and the minimum value is equal to or higher than a specified value ($V_{Kc}$, $V_{Kd}$), the battery is stopped from being further charged or discharged; the charge or discharge current is limited; or the charge or discharge current is decreased stepwise at each control start period, to prevent the low-performance cells from being overcharged or over-discharged, that is, for prevention of the partial cells from being deteriorated due to a performance difference between the respective cells.

8 Claims, 9 Drawing Sheets

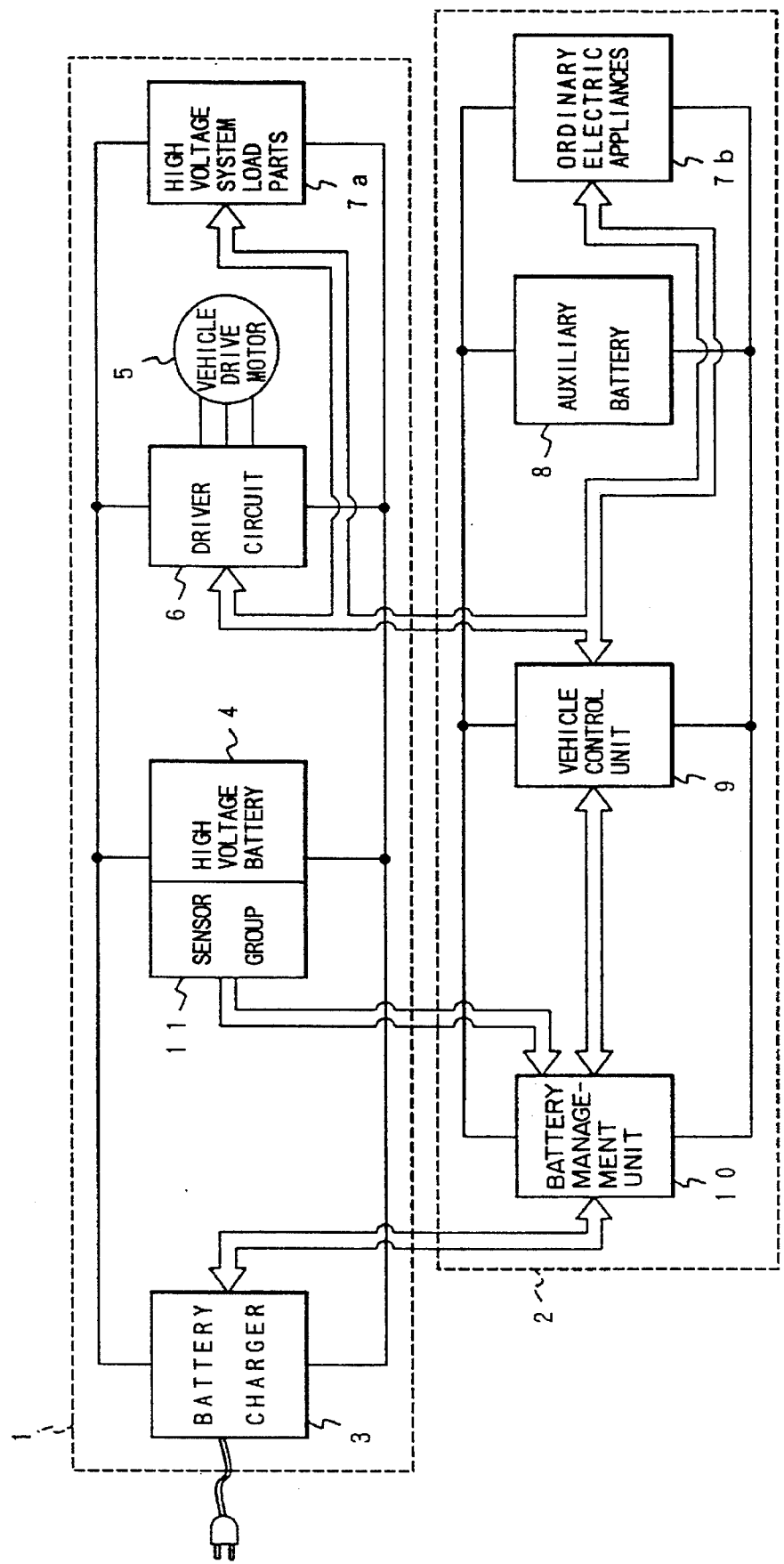
F I G. 1

BATTERY CHARGE/DISCHARGE CONTROL METHOD FOR ELECTRIC VEHICLE

BACKGROUND OF THE INVENTION

1. Field of the Invention

The present invention relates to a battery charge/discharge control method for an electric vehicle, more specifically to a method of controlling charge or discharge of a battery for the electric vehicle to prevent the battery from being over-charged or over-discharged due to difference in performance among battery cells for constituting the car battery.

2. Information Disclosure of the Related Art

In general, a battery mounted on an electric vehicle is of secondary battery which can be charged and discharged repeatedly. Therefore, when the remaining battery capacity decreases, it is necessary to take an appropriate control or management action before being over-discharged, for instance by charging the battery under restriction of charging current.

Various technique related to the battery charge/discharge control method has been so far proposed. For instance, Japanese Patent Application Laid-Open (Kokai) No. 60-245402 discloses such a battery charge/discharge control method that when any one of the battery open voltage and the battery voltage during vehicle travel drops below a predetermined voltage, respectively, an alarm is generated to inform the driver of a decrease in battery capacity, and in addition the battery capacity and the battery life can be both displayed by detecting the time required until the battery voltage reaches a constant voltage level when charged. By the way, in the electric vehicles, since a relatively high voltage is required as a power source for driving the vehicle, the battery used as the primary power source is usually formed by a combination battery such that a plurality of unit batteries each composed of a plurality of cells are combined with each other. In the case of a lead battery, for instance, a unit battery of nominal 12 V ($\approx$2.1 V$\times$6) is composed of six cells of 2.1 V, and a battery of nominal 336 V (=12 V$\times$28) can be obtained by connecting 28 unit batteries in series. Therefore, the total number of this battery cells is as large as 168 (=6$\times$28).

As a result, in the conventional battery charge/discharge control technique of detecting the terminal voltage of the whole battery cells to control the charge or discharge of the battery, since the partial battery cells tend to be overcharged or over-discharged due to difference in performance among the cells during the charge and discharge operation, there exists a problem in that the battery performance deteriorates or damaged, with the result that the battery life is shortened. In addition, once a difference among the individual cells begins to occur due to over-discharge, the battery performance deteriorates sharply with the lapse of time.

SUMMARY OF THE INVENTION

It is the object of the present invention to provide a method of controlling charge or discharge of a battery for an electric vehicle, which can prevent a plurality of cells for constituting the battery from being partially overcharged or over-discharged due to the difference in performance among the respective cells.

To achieve the above object, there is provided a method of controlling charge or discharge of a battery for an electric vehicle, said method comprising the steps of:

dividing the battery into a plurality of blocks each having a plurality of cells for constituting the battery in all;

detecting terminal voltages ($V_n$) of the divided blocks, respectively, to obtain a difference ($V_{max}-V_{min}$) in voltage between a maximum value ($V_{max}$) and a minimum value ($V_{min}$) from among the detected terminal voltages of the respective divided blocks; and controlling the charge or discharge of the battery (4) on the basis of the obtained difference ($V_{max}-V_{min}$) in voltage between the maximum and minimum values ($V_{max}$, $V_{min}$) of the terminal voltages ($V_n$) of the divided blocks.

In the first aspect of the invention, there is provided a method of controlling charge or discharge of the battery, wherein said controlling step includes the steps of:

setting a specified charge or discharge value ($V_{Kc}$, $V_{Kd}$);

comparing the obtained difference ($V_{max}-V_{min}$) in voltage between the maximum and minimum values ($V_{max}$, $V_{min}$) of the terminal voltages ($V_n$) with the set charge or discharge specified value ($V_{Kc}$, $V_{Kd}$); and stopping the battery from being further charged or discharged, when the obtained difference ($V_{max}-V_{min}$) in voltage between the maximum and minimum values ($V_{max}$, $V_{min}$) is equal to or larger than the set specified charge or discharge value ($V_{Kc}$, $V_{Kd}$).

In the second aspect of the invention, there is provided a method of controlling charge or discharge of the battery, wherein said controlling step includes the step of:

limiting charge or discharge current supplied to the battery, according to the difference ($V_{max}-V_{min}$) between the maximum and minimum voltages ($V_{max}$, $V_{min}$) of the respective blocks of the battery (4).

In the third aspect of the invention there is provided a method of controlling charge or discharge of the battery, wherein said limiting step includes the step of: determining a charge or discharge limit value ($\Delta I_c$, $\Delta I_d$) of the battery, with reference to a map representative of relationship between the charge or discharge current limit value ($\Delta I_c$, $\Delta I_d$) and the obtained difference ($V_{max}-V_{min}$) in voltage between the maximum and minimum values ($V_{max}$, $V_{min}$); and decreasing the charge or discharge current so that the current is equal to or smaller than the determined charge or discharge current limit value ($\Delta I_c$, $\Delta I_d$).

In the fourth aspect of the invention, there is provided a method of controlling charge or discharge of the battery, further comprising the steps of:

detecting temperatures ($T_n$) of the divided blocks; and correcting the detected terminal voltages ($V_n$) of the divided blocks on the basis of temperature coefficients ($K_T$) determined according to detected temperatures of the divided blocks to obtain temperature corrected terminal voltages ($V_{Tn}=V_n \cdot K_T$)

As described above, in the battery charge or discharge control method according to the present invention, a plurality of cells are divided into a plurality of blocks; and the difference between the maximum voltage value and the minimum voltage value selected from a plurality of the divided blocks is calculated. Further, when the calculated difference between the two exceeds a predetermined value, the battery is stopped from being further charged or discharged; the charge or discharge current is limited; or the charge or discharge current is decreased stepwise whenever the control processing is started. Therefore, it is possible to prevent the battery cells from being overcharged or over-discharged partially due to the performance difference between the cell blocks for constituting the high voltage battery, with the result that the battery life can be improved.

Further, when the voltage difference between the cell blocks is corrected under consideration of the temperature, it is possible to further increase the reliability of the battery charge or discharge control method.

BRIEF DESCRIPTION OF THE DRAWINGS

FIG. 1 is a block diagram showing an electric vehicle;

DETAILED DESCRIPTION OF THE PREFERRED EMBODIMENTS

Figure 2:
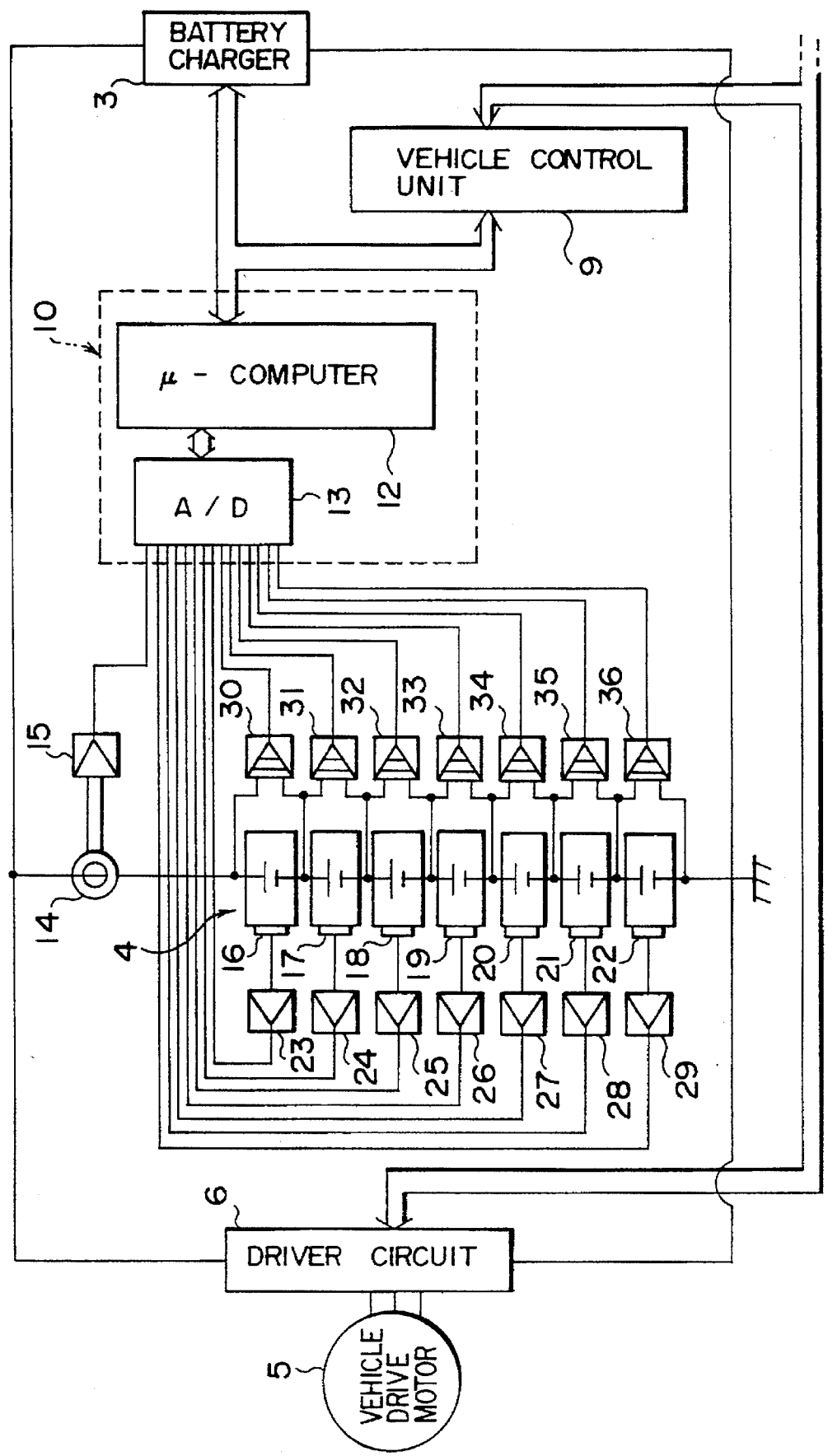
FIG. 2 is a block diagram showing a battery management unit and its associated elements or units of an electric vehicle.

Preferred embodiments of the present invention will become understood from the following detailed description referring to the accompanying drawings.

First Embodiment

The first embodiment of the battery charge or discharge control method according to the present invention will be described hereinbelow with reference to FIGS. 1 to 7.

In FIG. 1, a vehicle battery system of an electric vehicle is composed of a high voltage power source system 1 and a low voltage power source system 2. In the high voltage power source system 1, a high voltage battery 4 is connected to a vehicle drive motor 5 via a driver circuit (e.g., inverter) 6, and further directly to a high voltage system load parts 7a such as air conditioner, heater and the like.

The high voltage battery 4 is of lead battery (in this embodiment), in which 28-units of batteries of nominal 12 V composed of six cells of 2.1 V are connected in series to obtain a combination battery of nominal 336 V ($\approx 2.1$ V $\times 6 \times 28$). When the battery capacity decreases below a specified value, the combination battery is charged by a battery charger 3 connected to an external power source (not shown). Further, the vehicle drive motor 5 is of AC induction motor, for instance, and a driving power of the vehicle drive motor 5 is transmitted to a vehicle driving system (a drive shaft, a differential gear, etc.) of an electric vehicle. Further, when the electric vehicle is traveling, the battery 4 can be charged by the regenerative power of the vehicle drive motor 5 through the driver circuit 6.

On the other hand, in the low voltage power source system 2, an auxiliary battery 8 (different from the high voltage battery 4) is connected to ordinary electric appliances 7b (e.g., wiper, radio, various display instruments, etc.), a vehicle control unit 9 for controlling an electric vehicle, and a battery management unit 10 for managing the high voltage battery 4.

The vehicle control unit 9 controls the vehicle drive and other controls required when the electric vehicle is traveling, on the basis of the commands of the driver. In more detail, the vehicle control unit 9 detects various vehicle operating conditions on the basis of the signals transmitted by the battery management unit 10 and various sensors and switches (not shown), and controls the vehicle drive motor 5 via the driver circuit 6 or turns on or off the high voltage system electric load parts 7a or displays various necessary data for the driver on or through the ordinary electric appliances (e.g., display units).

The battery management unit 10 detects the remaining capacity of the high voltage battery 4 on the basis of signals of a sensor group 11 (described later in further detail) for detecting the voltage of the high voltage battery 4, the charge or discharge current thereof, the temperature thereof, etc., and further controls the high voltage battery 4 (e.g., the prevention of the high voltage battery 4 from being overcharged or over-discharged). In addition, the battery management unit 10 outputs control commands and necessary measurement data to the battery charger 3 and the vehicle control unit 9 when the high voltage battery 4 is being charged or discharged.

The battery management system composed of the battery management unit 10 and other elements or units will be described hereinbelow with reference to FIG. 2.

As shown, in this embodiment, the high voltage battery (336 V) is divided into seven battery blocks (7×48 V) each composed of four unit batteries (4×12 V) each having six cells (6×2 V).

The battery management unit 10 is composed of a microcomputer 12, an A/D converter 13 connected to the microcomputer 12, various peripheral circuits (not shown). To the A/D converter 13, various elements are connected such as an amplifier 15 for amplifying a signal of a current sensor 14 (one of sensors for constituting the sensor group 11); respective amplifiers 23 to 29 for amplifying signals of temperature sensors 16 to 22 of the sensor group 11; and various amplifiers 30 to 36 for amplifying signals of various voltage sensors of the sensor group 11. That is, various analog signals representative of the battery charge or discharge current, temperatures of the respective battery blocks, and voltages of the respective battery blocks are converted from the analog signals to corresponding digital signals by the A/D converter 13, before inputted to the microcomputer 12.

The current sensor 14 is of hall element type. Being interconnected midway to a power line extending from a positive terminal of the high voltage battery 4, this current sensor 14 detects the charge or discharge current of the high voltage battery 4. Further, the above-mentioned seven temperature sensors 16 to 22 are of thermistor type, respectively, for instance. Each temperature sensor is connected to each block composed of four unit batteries of nominal 12 V connected in series, to detect each temperature of each block. Further, the seven amplifiers (voltage sensors) 30 to 36 are of differential amplifier type, respectively. Each differential amplifier detects each terminal voltage (nominal 48 V) of each block.

The above-mentioned microcomputer 12 controls the high voltage battery 4 through the remaining capacity measurement processing, charge or discharge control processing, etc. In the case of the charge or discharge control processing, the microcomputer 12 monitors the respective voltages of a plurality of the divided blocks of the high voltage battery 4, to prevent difference in performance among the respective cells for constituting the high voltage battery 4 from being increased due to charge or discharge; that is, to prevent the high voltage battery 4 from being deteriorated or damaged partially.

Figure 3:
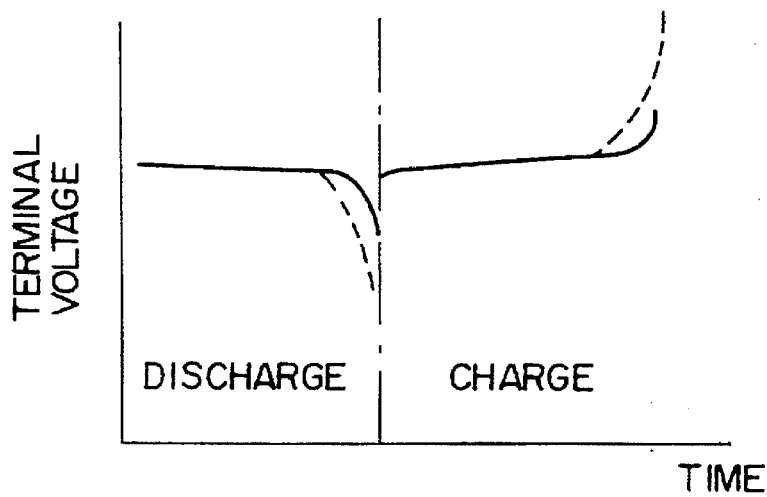
FIG. 3 is a graphical representation showing the battery terminal voltage with the lapse of time when charged or discharged.

In more detail, in the ordinary battery mounted on an electric vehicle, as shown in FIG. 3, the terminal voltage drops when the battery is discharged during traveling, but rises when the vehicle is stopped and then charged. Here, the terminal voltage drops gradually during the discharge but drops abruptly when over-discharged. In the same way, the terminal voltage rises gradually by charging but rises abruptly when overcharged. Therefore, when the battery is composed of a plurality of battery cells, once the difference in performance among the respective cells develops, the difference in battery performance increases, as shown by solid lines and dashed lines in FIG. 3, at the end of the discharge (due to over-discharge) or at the end of the charge (due to overcharge).

Therefore, in the case of the high voltage battery 4 composed of 28 series-connected unit cells (each having six cells) (28×6=168 cells in total), control measures seven voltages of the seven blocks each composed of four unit batteries (i.e., composed of 4×6=24 cells) (7×24=168 cells in total), respectively. Further, when a voltage difference between the maximum voltage and the minimum voltage exceeds a predetermined value, the microcomputer 12 stops the high voltage battery 4 from being further charged or discharged, for prevention of the high voltage battery 4 from being degraded or damaged due to the overcharge or over-discharge.

Figure 4:
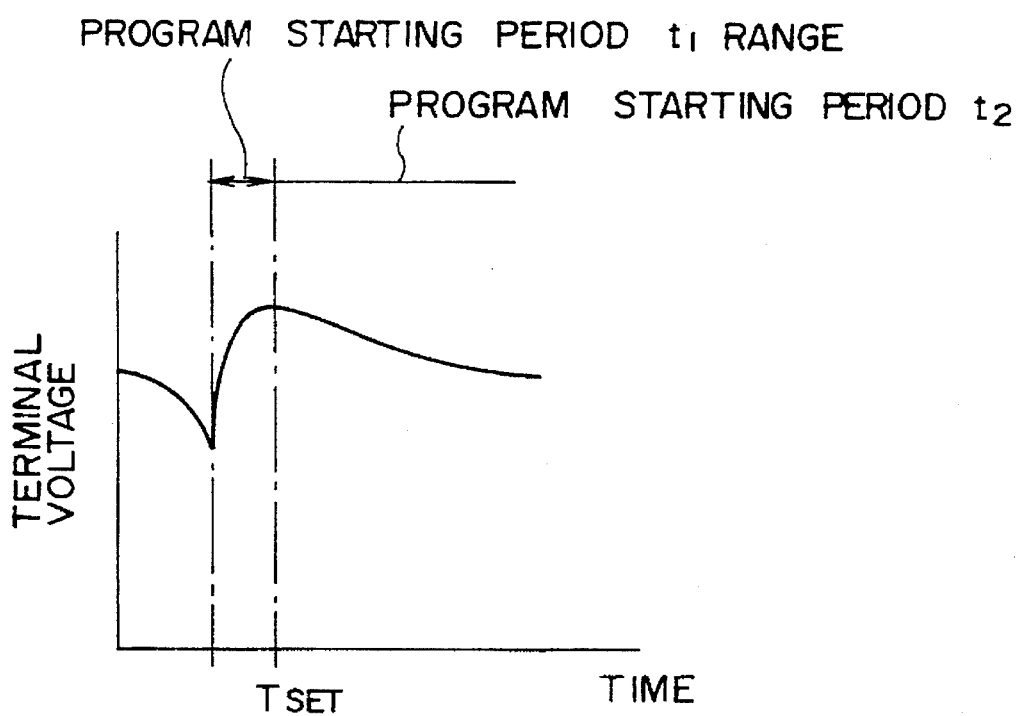
FIG. 4 is a graphical representation showing the battery terminal voltage with the lapse of time when discharged and then charged, for assistance in explaining the specific time $T_{SET}$ and starting periods $t_1$ and $t_2$ of the charge or discharge control processing.
Figure 5A:
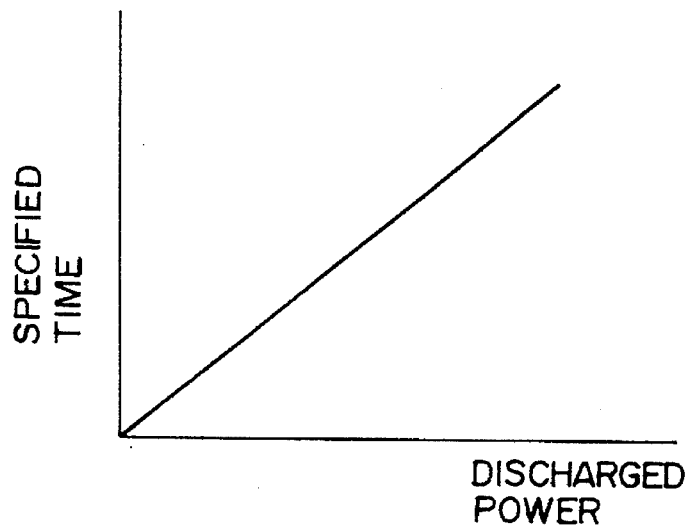
FIG. 5A is a graphical representation showing an example of the relationship between the specific time and discharged power.
Figure 5B:
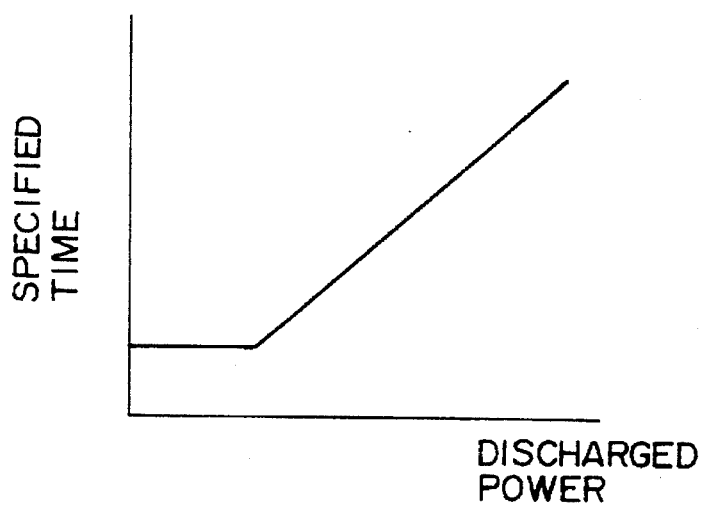
FIG. 5B is a graphical representation showing another example of the relationship between the specific time and discharged power.

The above-mentioned control processing for the high voltage battery 4 by the microcomputer 12 is started at specified time intervals according to the charge or discharge status of the high voltage battery 4. In more detail, here as shown in FIG. 4, a specific time $T_{SET}$ is defined as the time interval from when the high voltage battery 4 is released open from discharge and thereby the terminal voltage begins to rise sharply to when the terminal voltage reaches a peak value. This specified time $T_{SET}$ differs according to the battery characteristics. That is, as shown in FIG. 5A, this specified time increases roughly in proportion to the discharged power. Or else, as shown in FIG. 5B, this specified time $T_{SET}$ is constant when the discharged power is small but increases roughly in proportion to the discharged power.

Accordingly, it is necessary to monitor the terminal voltage of the high voltage battery 4 at relatively short time intervals ($t_1$) from when the battery is charged to when the specified time has elapsed. For instance, until the specified time $T_{SET}$ determined by the discharged power has elapsed, the battery management processing is started at a short starting period $t_1$ of about one minute, for instance; and after that the battery management processing is started at another long starting period $t_2$ of about one hour, for instance, for saving of power consumed for the battery management.

Figure 6:
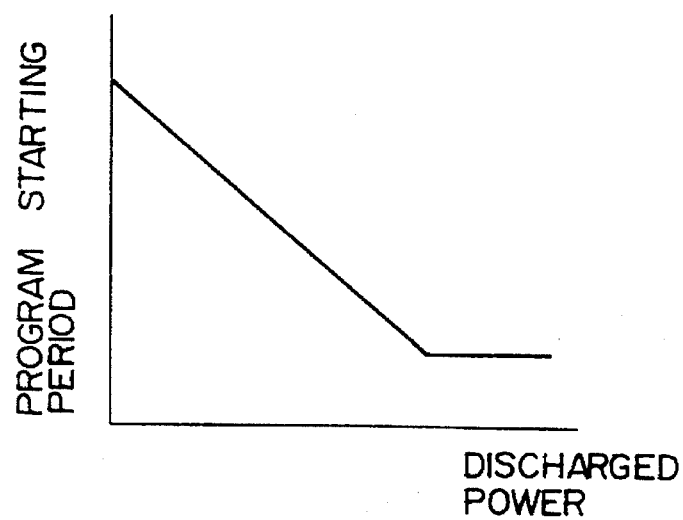
FIG. 6 is a graphical representation showing the relationship between the staring period and discharged power.

On the other hand, as shown in FIG. 6, when the discharged power is small, it is possible to lengthen the starting period of the battery management processing and after that to shorten the starting period with increasing discharged power. Further, the specified time $T_{SET}$ can be fixed to 30 minute, for instance. In this case, the battery management processing is executed at a starting period according to the discharged power; and after the specified time has elapsed, the battery management processing is started for each one hour, for instance.

Figure 7:
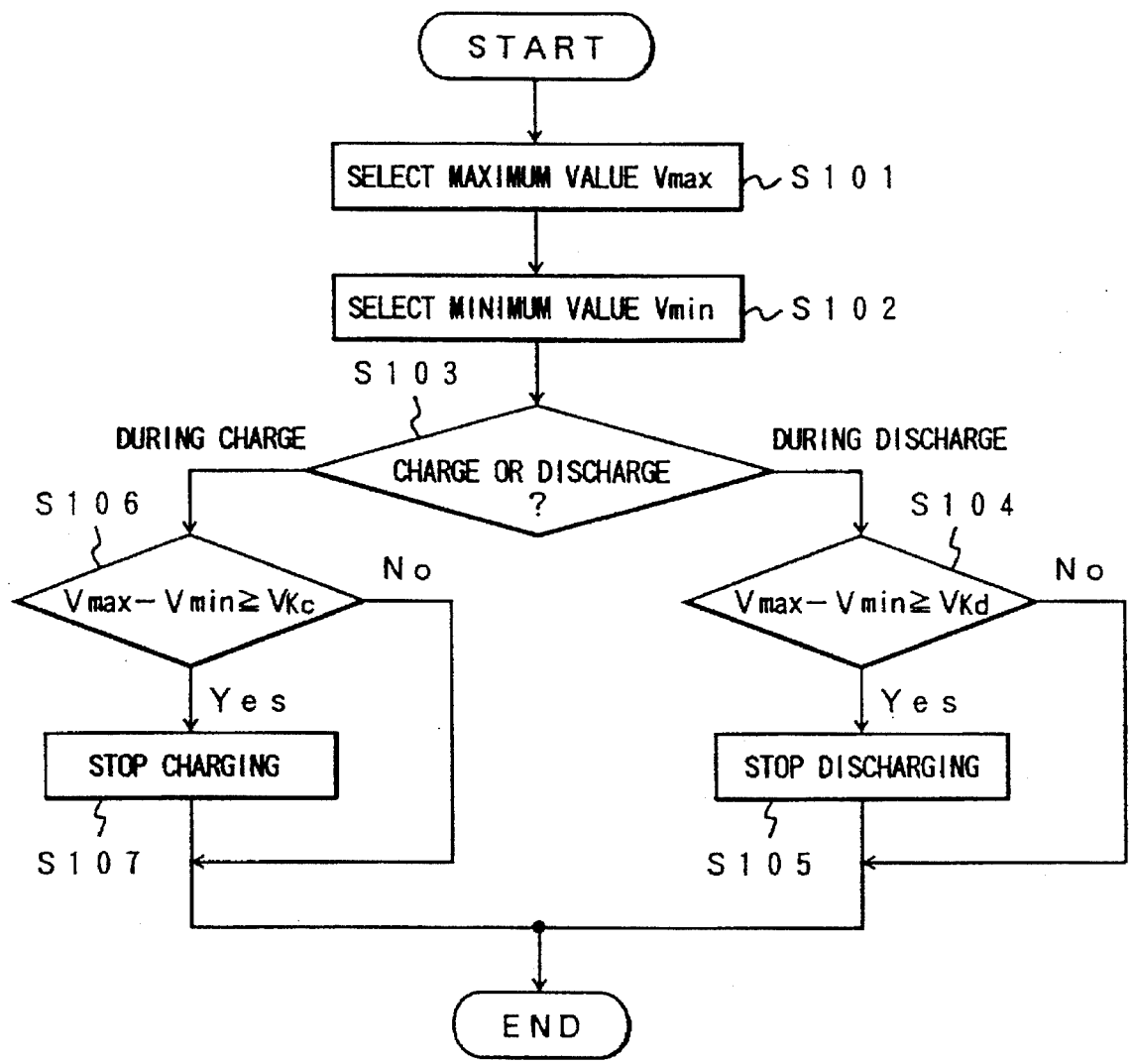
FIG. 7 is a flowchart showing the first embodiment of the charge or discharge control processing according to the present invention.

The charge or discharge control processing executed by the microcomputer 12 in accordance with a charge or discharge control program will be explained with reference to a flowchart shown in FIG. 7.

First, in step S101, the microcomputer 12 (referred to as control hereinafter, simply) detects the terminal voltages $V_1$, $V_2$, ... $V_7$ of the divided battery blocks, respectively, and selects the maximum value $V_{max}$ from among the respective block terminal voltages $V_1$, $V_2$, ... $V_7$ of the high voltage battery 4 detected by the respective amplifiers 30 to 36. In step S102, control selects the minimum value $V_{min}$ from among the respective block terminal voltages $V_1$, $V_2$, ... $V_7$ of the high voltage battery 4 detected by the respective amplifiers 30 to 36.

Further, in step S103, control checks whether the high voltage battery 4 is now being discharged or charged. During discharge, the high voltage battery 4 drives the vehicle drive motor 5 or activates the high voltage system electric load parts 7a (e.g., air conditioner, heater, etc.). During charge, the high voltage battery 4 is charged by the regenerative power generated by the vehicle drive motor 5 when the vehicle is traveling by the vehicle inertia or by an external power source through the battery charger 3 when the vehicle is kept stopped.

When the high voltage battery 4 is being discharged, control proceeds from step S103 to step S104, control detects the maximum voltage $V_{max}$ and the minimum voltages $V_{min}$ from among the respective block terminal voltages $V_1$, $V_2$, ..., calculates a difference between the two ($V_{max}-V_{min}$), and compares the calculated difference with an allowable specified value $V_{Kd}$ of the voltage difference among the respective blocks during discharging (which is caused by a difference in performance among the respective cells). If the compared result is $V_{max}-V_{min}<V_{Kd}$, control ends this program, and if $V_{max}-V_{min}\geq V_{Kd}$, control proceeds to step S105 to stop the high voltage battery 4 from being further discharged to the high voltage system electric load parts 7a (e.g., air conditioner, heater, etc.), with the result that it is possible to prevent the low-performance cells from being over-discharged and thereby from being degraded acceleratively.

On the other hand, when the high voltage battery 4 is being charged in step S103, control proceeds from step S103 to step S106, control detects the maximum voltage $V_{max}$ and the minimum voltages $V_{min}$ of the respective block terminal voltages $V_1$, $V_2$, ..., calculates a difference between the two ($V_{max}-V_{min}$) and compares the calculated difference with an allowable specified value $V_{Kc}$ of the voltage difference among the respective blocks during charge (which caused by a difference in performance among the respective cells). If the compared result is $V_{max}-V_{min}<V_{Kc}$, control ends this program, and if $V_{max}-V_{min}\geq V_{Kc}$, control proceeds to step S107 to stop the high voltage battery 4 from being further charged by the battery charger 3, with the result that it is possible to prevent the low-performance cells from being overcharged and thereby from being degraded acceleratively, ending the program.

As described above, in the management method according to the present invention, it is possible to previously prevent the difference in performance among the respective cells constituting the high voltage battery 4 from being increased and thereby the high voltage battery 4 from being deteriorated or damaged, so that the battery life can be increases markedly. In addition, in this charge or discharge control method, since the charge or discharge of each individual cells is not controlled, it is possible to economize the control cost of the high voltage battery 4.

Second Embodiment

The second embodiment will be described hereinbelow with reference to FIG. 8. This second embodiment is different from the first embodiment in that the charge or discharge current is limited according to the difference between the maximum and minimum voltages of the respective blocks of the high voltage battery 4. Further, the hardware is quite the same as with the case of the first embodiment.

Figure 8:
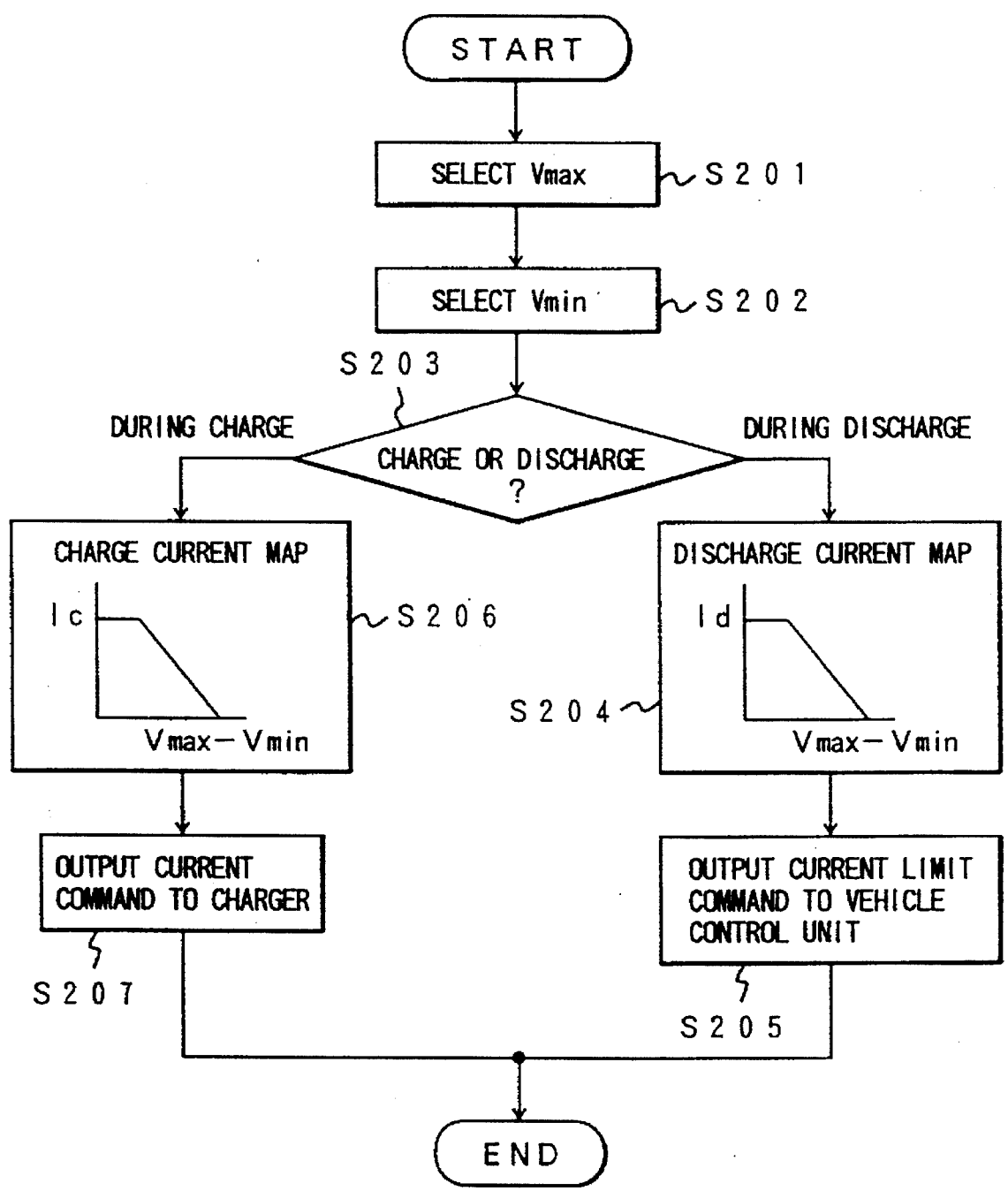
FIG. 8 is a flowchart showing the second embodiment of the charge or discharge control processing according to the present invention.

In the charge or discharge control program shown in FIG. 8, in the same way as with the case of the first embodiment, in steps S201, control selects the maximum value $V_{max}$ of the respective block terminal voltages $V_1, V_2, \ldots V_7$ of the high voltage battery 4 detected by the respective amplifiers 30 to 36. In step S202, control selects the minimum value $V_{min}$ of the respective block terminal voltages $V_1, V_2, \ldots V_7$ of the high voltage battery 4 detected by the respective amplifiers 30 to 36, in the same way as with the case of the first embodiment.

Further, in step S203, control checks whether the high voltage battery 4 is now being discharged or charged. Control proceeds to step S204 during discharge and to step S206 during charge, respectively.

During discharge, in step S204, control sets a discharge current limit value $I_d$ with reference to a discharge current map. In step S205, control outputs a current limit command to the vehicle control unit 9 so that the discharge current of the high voltage battery 4 will not exceed the limit value $I_d$, ending the program.

The above-mentioned discharge current map represents the relationship between the discharge current limit value $I_d$ and the voltage difference between $V_{max}-V_{min}$ (as parameter), which has been previously obtained empirically and stored in a ROM of the microcomputer 12. As understood with reference to a graph shown in step S204, the discharge limit current value $I_d$ is determined to be a relatively large constant value when the voltage difference between $V_{max}-V_{min}$ is small, but to decrease with increasing voltage difference between $V_{max}-V_{min}$, down to "0" finally (i.e., discharge stop).

On the other hand, during charge, in step S206, control sets a charge current limit value $I_c$ with reference to a charge current map. In step S207, control outputs a current limit command to the battery charger 3 so that the charge current to the high voltage battery 4 will not exceed the limit value $I_c$, ending the program.

The above-mentioned charge current map represents the relationship between the charge current limit value $I_c$ and the voltage difference between $V_{max}-V_{min}$ (as parameter), which has been previously obtained empirically and stored in the ROM of the microcomputer 12. As understood with reference to a graph shown in step S206, the limit current value $I_c$ is determined to be a relatively large constant value when the voltage difference between $V_{max}-V_{min}$ is small, but to decrease with increasing voltage difference between $V_{max}-V_{min}$, down to "0" finally (i.e., charge stop).

In this second embodiment, the same effect as with the case of the first embodiment can be of course obtained. Further, in this embodiment, since the charge or discharge current of the high voltage battery 4 is automatically limited down to zero, to prevent the low performance cells from being overcharged or over-discharged, there exists such an advantage that it is unnecessary to stop the vehicle immediately during traveling or to stop the charging operation immediately during charging.

Third Embodiment

The third embodiment will be described hereinbelow with reference to FIGS. 9 to 11. This third embodiment is different from the first and second embodiments in that the respective block terminal voltages $V_n$ of the high voltage battery 4 are corrected according to the battery temperature, respectively to limit the charge or discharge current according to the voltage difference between $V_{max}-V_{min}$ or to stop the charge or discharge when the difference value exceeds the specified value, respectively. Further, the hardware is quite the same as with the case of the first embodiment.

Figure 9:
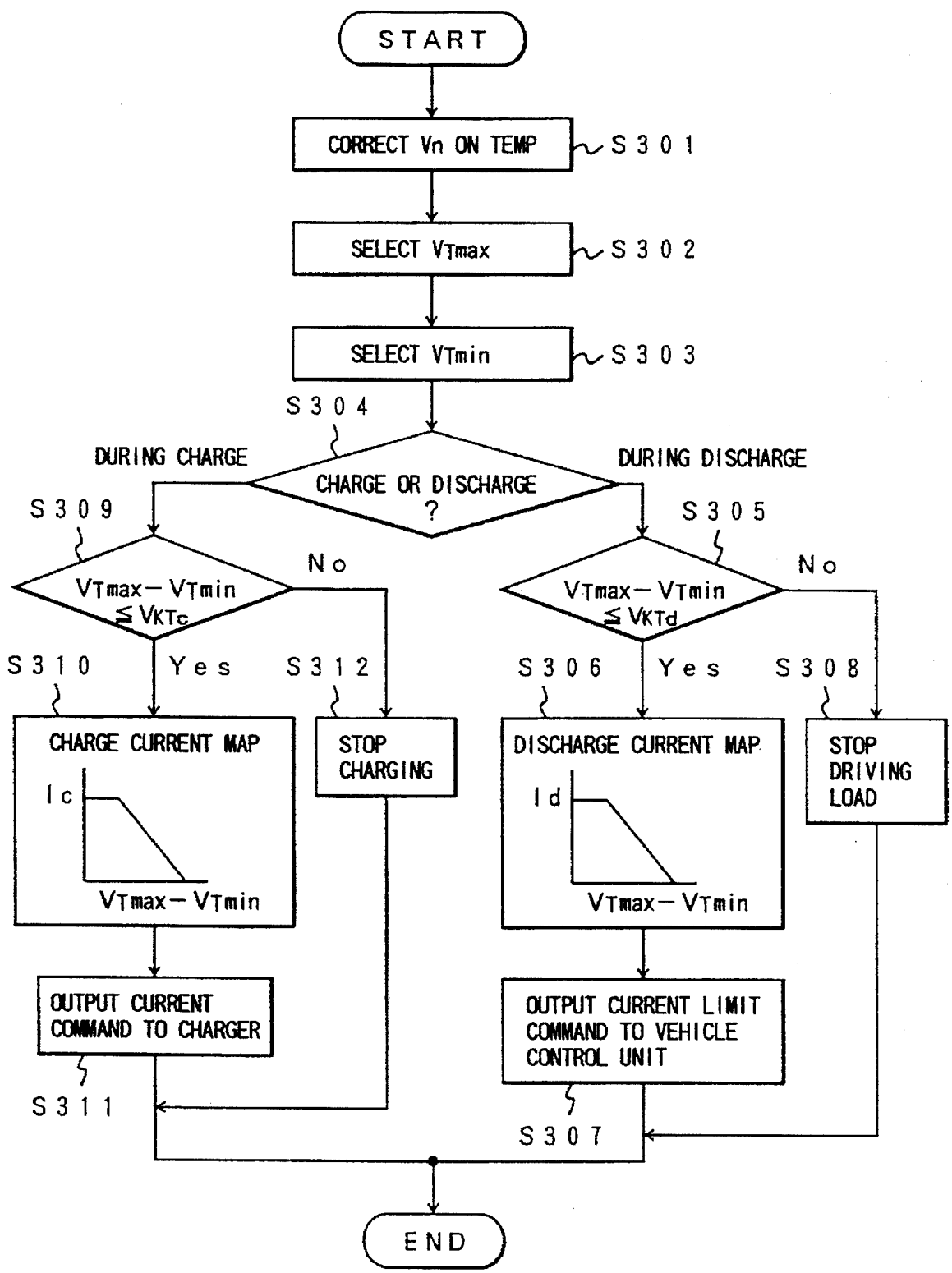
FIG. 9 is a flowchart showing the third embodiment of the charge or discharge control processing according to the present invention.
Figure 10:
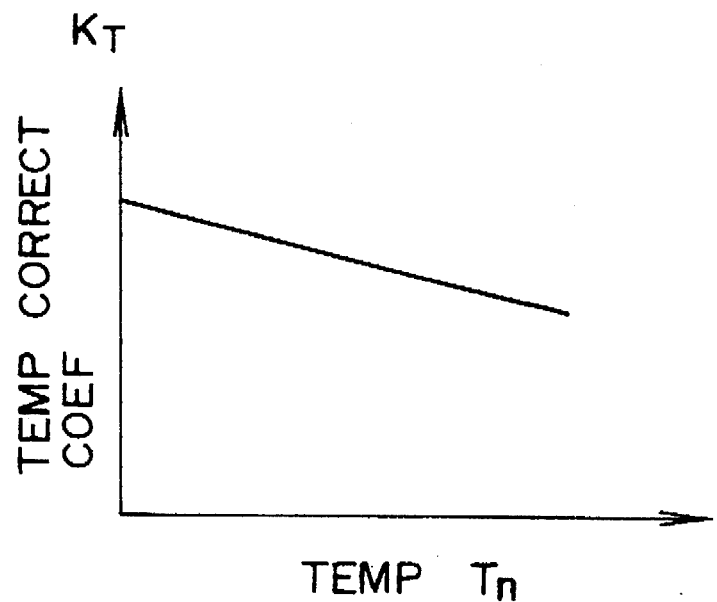
FIG. 10 is a graphical representation showing the relationship between the battery temperature $T_n$ and the temperature correction coefficient $K_T$.

In the charge or discharge control processing shown in FIG. 9, in step S301, control detects each temperature $T_n$ ($T_1, T_2, \ldots T_7$) of each block of the high voltage battery 4 (detected by the temperature sensors 16 to 22, respectively), and obtains each temperature correction coefficient $K_{Tn}$ (($K_{T1}, K_{T2}, \ldots K_{T7}$) by a map retrieval, for instance. The detected terminal voltage $V_n$ ($V_1, V_2, \ldots V_7$) of each block of the high voltage battery 4 is corrected on the basis of the obtained temperature correction coefficient $K_T$ to obtain each corrected voltage $V_{Tn}$ ($V_{T1}=K_{T1}\cdot V_1$; $V_{T2}=K_{T2}\cdot V_2$; $\ldots$, $V_{T7}=K_{T7}\cdot V_7$).

Further, in step S302, control sets the maximum value $V_{Tmax}$ of the respective corrected block terminal voltages $V_{Tn}$ of the high voltage battery 4. In step S303, control selects the minimum value $V_{Tmin}$ of the respective corrected block terminal voltages $V_{Tn}$ of the high voltage battery 4.

Here, the effect of the battery voltage correction according to the temperature will be explained. In general, there exists such a tendency that the battery voltage increases with increasing temperature. Therefore, as shown in FIG. 10, the temperature correction coefficients $K_T$ having a negative gradient (i.e., the coefficients $K_T$ decreases with increasing temperature T) are stored in the form of a map, and each temperature correction coefficient $K_T$ is determined according to each block temperature $T_n$ to correct each block terminal voltage $V_n$. In this embodiment, therefore, it is possible to compare the block terminal voltage under the same temperature conditions, so that it is possible to obtain more accurate maximum and minimum value $V_{Tmax}$ and $V_{Tmin}$, respectively.

Further, in step S304, control checks whether the high voltage battery 4 is now being charged or discharged. During discharge, control proceeds from step S304 to step S305, and detects the maximum voltage $V_{Tmax}$ and the minimum voltage $V_{Tmin}$ of the respective corrected block terminal voltages $V_{Tn}$, calculates a difference between the two ($V_{Tmax}-V_{Tmin}$), and compares the calculated difference with an allowable specified value $V_{KTd}$ of the voltage difference among the respective temperature-corrected blocks during discharge. If the compared result is $V_{Tmax}-VT_{min} \leq V_{KTd}$, control proceeds from step S305 to step S306, to set the discharge current limit current $I_d$ with reference to a discharge map in the same way as with the case of the second embodiment. Further, in step S307, control outputs a current limit command to the vehicle control unit 9 so that the discharge current of the high voltage battery 4 will not exceed the limit value $I_d$, ending the program.

Figure 11:
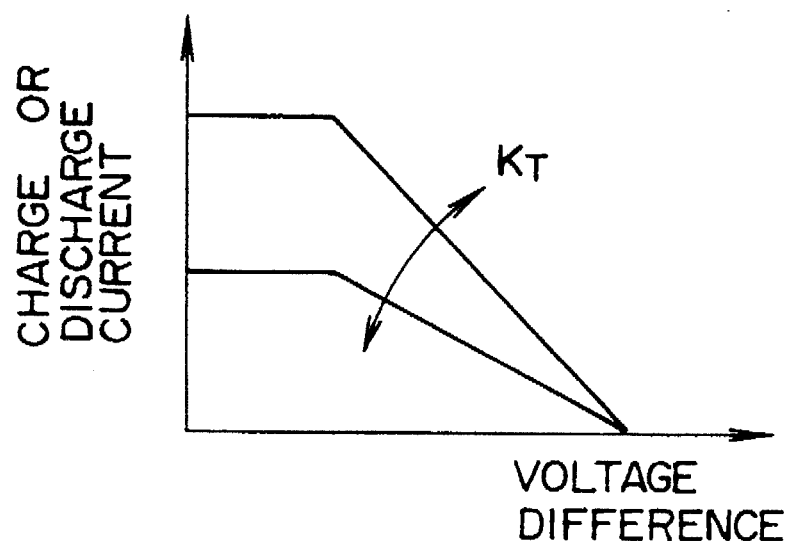
FIG. 11 is a graphical representation showing the relationship between the voltage difference and the charge or discharge current $I_d$ with the temperature as parameter.

In this embodiment, as shown in FIG. 11, the limit value $I_d$ according to the voltage difference between the two $(V_{Tmax}-V_{Tmin})$ of the respective blocks is so determined as to increase with increasing temperature correction coefficient $K_T$ (i.e., with decreasing temperature). In other words, in this embodiment, since the discharge current limit value $I_d$ is determined under consideration of the battery capacity change due to change in the block temperature, it is possible to further reliably control the driving performance of the electric vehicle. The same can be applied to the charge current map as described in step S310, later.

In step S305, if $V_{Tmax}-V_{Tmin}>V_{KTd}$, control proceeds from step S305 to step S308 to output a command to the vehicle control unit 9 to stop the high voltage battery 4 from being further discharged to the high voltage system load parts 7a (e.g., air conditioner, heater, etc.), with the result that it is possible to prevent the cells from being over-discharged continuously, ending the program.

On the other hand, during discharge in step S304, control proceeds from step S304 to step S309, and detects the maximum voltage $V_{Tmax}$ and the minimum voltages $V_{Tmin}$ of the respective temperature-corrected block terminal voltages $V_{Tn}$, calculates a difference between the two $(V_{Tmax}-V_{Tmin})$, and compares the calculated difference with an allowable specified value $V_{KTc}$ of the voltage difference among the respective temperature-corrected blocks during charge. If the compared result is $V_{Tmax}-VT_{min} \leq V_{KTc}$, control proceeds from step S309 to step S310, to set the charge current limit current $I_c$ with reference to a discharge map in the same way as with the case of the second embodiment. Further, in step S311, control outputs a current limit command to the battery charger 3 so that the charge current of the high voltage battery 4 will not exceed the limit value $I_c$, ending the program.

In step S309, if $V_{Tmax}-V_{Tmin}>V_{KTc}$, control proceeds from step S309 to step S312 to output a command to the battery charger 3 to stop the battery charger 3 from being further charged by the battery charger 3, with the result that it is possible to prevent the cells from being overcharged continuously, ending the program.

In this third embodiment, since the high voltage battery 4 can be managed more accurately under consideration of the temperatures of the battery cell blocks, it is possible to prevent the cells from being overcharged or over-discharged due to difference in performance among the cells more reliably under consideration of the block temperatures.

Fourth Embodiment

The fourth embodiment will be described hereinbelow with reference to FIG. 12. This fourth embodiment is different from the third embodiment in that when the difference between the maximum and minimum values $(V_{Tmax}-V_{Tmin})$ of the respective blocks of the high voltage battery 4 exceeds a specified value, the discharge current is decreased stepwise to prevent the minimum voltage block from being over-discharged, or the charge current is decreased stepwise to prevent the maximum voltage block from being overcharged. Further, the hardware is quite the same as with the case of the other embodiments.

Figure 12:
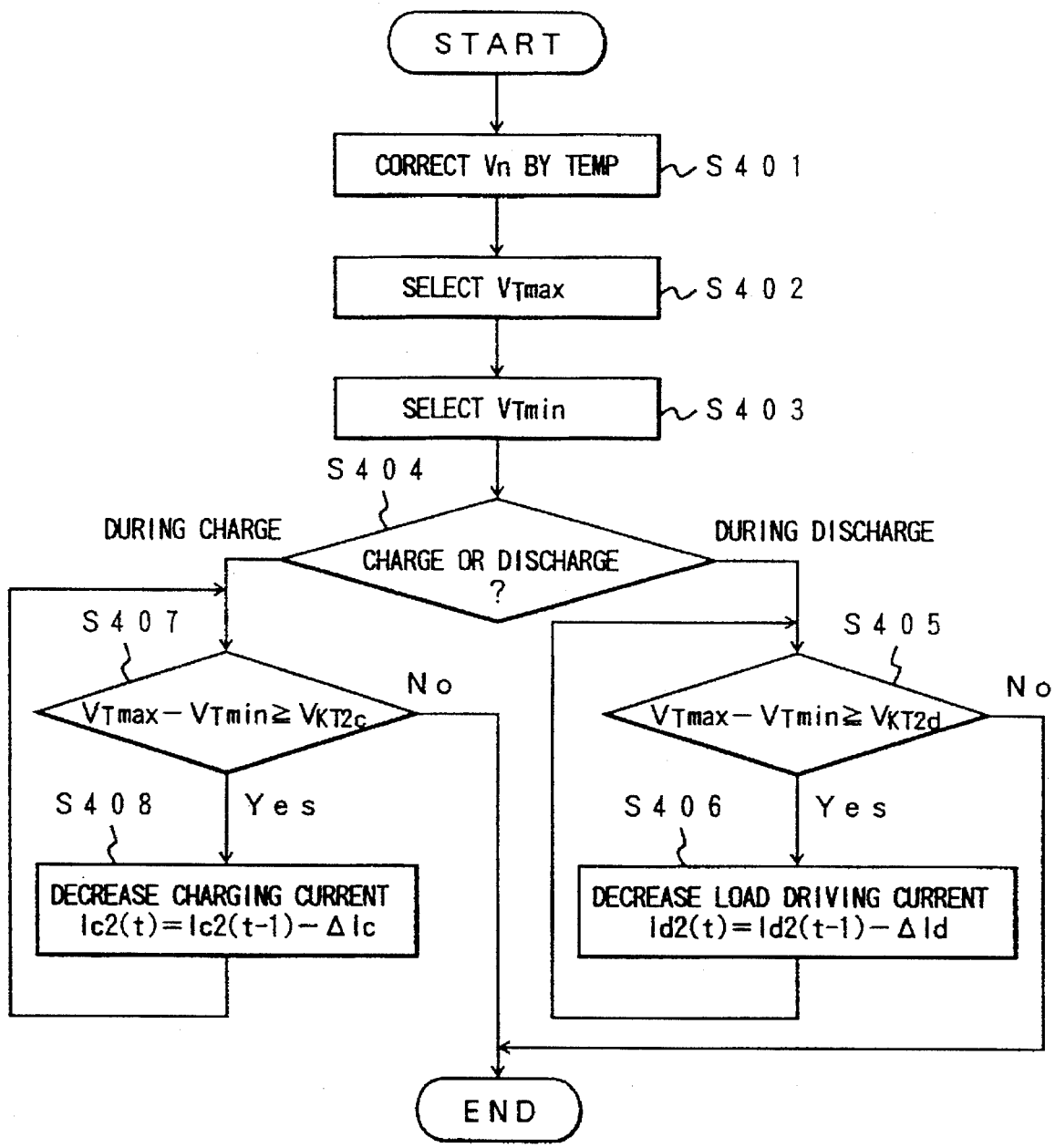
FIG. 12 is a flowchart showing the fourth embodiment of the charge or discharge control processing according to the present invention.

In the charge or discharge-control processing shown in FIG. 12, in step S401, control detects each temperatures $T_n$ of each block of the high voltage battery 4 (detected by the temperature sensors 16 to 22), and obtains each temperature correction coefficient $K_{Tn}$ by a map retrieval, for instance. The detected terminal voltage $V_n$ of each block of the high voltage battery 4 is corrected on the basis of the obtained temperature correction coefficient $K_T$ to obtain each corrected terminal voltage $V_{Tn}$ $(V_{Tn}=K_{Tn} \cdot V_n)$ Further, in step S402, control selects the maximum value $V_{Tmax}$ of the respective corrected block terminal voltages $V_{Tn}$ of the high voltage battery 4. In step S403, control selects the minimum value $V_{Tmin}$ of the respective corrected block terminal voltages $V_{Tn}$ of the high voltage battery 4, in the same way as with the case of the third embodiment.

Further, in step S404, control checks whether the high voltage battery 4 is now being charged or discharged. During discharge, control proceeds from step S404 to step S405 to detect the maximum voltage $V_{Tmax}$ and the minimum voltage $V_{Tmin}$ of the respective corrected block terminal voltages $V_{Tn}$, calculates a difference between the two $(V_{Tmax}-V_{Tmin})$, and compares the calculated difference with an allowable specified value $V_{KT2d}$ of the voltage difference among the respective temperature-corrected blocks during discharge. If the compared result is $V_{Tmax}-V_{Tmin}<V_{KT2d}$, control ends the program because no problem arises even if the discharge is kept continuously. In the case of $V_{Tmax}-VT_{min} \geq V_{KT2d}$, control proceeds to S406 to prevent the block of the minimum voltage from being over-discharged. Control outputs a command signal to the vehicle control unit 9 to decrease the load drive current $I_{d2}$ flowing through the vehicle drive motor 5 and the high voltage system electric load parts 7a by a set value $\Delta I_d$ at each program starting period t of the discharge control processing, as $I_{d2(t)}=I_{d2(t-1)}-\Delta I_d$, returning to step S405.

On the other hand, if charging in step S404, control proceeds from step S404 to step S407 to detect the maximum voltage $V_{Tmax}$ and the minimum voltages $V_{Tmin}$ of the respective corrected block terminal voltages $V_{Tn}$, calculates a difference between the two $(V_{Tmax}-V_{Tmin})$, and compares the calculated difference with an allowable specified value $V_{KT2c}$ of the voltage difference among the respective temperature-corrected blocks during charge. If the compared result is $V_{Tmax}-VT_{min}<V_{KT2c}$, control ends the program because no problem arises even if the charge is kept continuously. In the case of $V_{Tmax}-V_{Tmin} \geq V_{KT2c}$, control proceeds to step S408 to prevent the block of the maximum voltage from being overcharged. Control outputs a command signal to the battery charger 3 to decrease the charge current $I_{c2}$ by the battery charger 3 and the regenerative power by a set value $\Delta I_c$ at each program starting period of the charge control processing t, as $I_{c2(t)}=I_{c2(t-1)}-\Delta I_c$, returning to step S407.

As described above, in the fourth embodiment, it is possible to directly control the battery block including the low performance cells in the high voltage battery 4 so as not to be overcharged or over-discharged more reliably.

Further, in this fourth embodiment, although the each block terminal voltages are corrected under consideration of the battery temperature, it is also possible to eliminate the temperature correction, that is, to directly control the charge or discharge of the low-performance cells.

As described above, in the battery charge or discharge control method according to the present invention, a plurality of cells are divided into a plurality of blocks; and the difference between the maximum voltage value and the minimum voltage value selected from a plurality of the divided blocks is calculated. Further, when the calculated difference between the two exceeds a predetermined value, the battery is stopped from being further charged or discharged; the charge or discharge current is limited; or the charge or discharge current is decreased stepwise whenever the control program is started. Therefore, it is possible to prevent the battery cells from being overcharged or overdischarged partially due to the performance difference between the cell blocks for constituting the high voltage battery, with the result that it is possible to prevent the battery life from being lowered. Further, when the voltage difference between the cell blocks is corrected under consideration of the temperature, it is possible to further increase the reliability of the battery charge or discharge control method.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A method of controlling charge or discharge of a battery for an electric vehicle, said method comprising the steps of:

dividing the battery into a plurality of blocks each having a plurality of cells for constituting the battery in all;

detecting terminal voltages ($V_n$) of the divided blocks, respectively, to obtain a difference ($V_{max}-V_{min}$) in voltage between a maximum value ($V_{max}$) and a minimum value ($V_{min}$) from among the detected terminal voltages of the respective divided blocks; and controlling the charge or discharge of the battery (4) on the basis of the obtained difference ($V_{max}-V_{min}$) in voltage between the maximum and minimum values ($V_{max}, V_{min}$) of the terminal voltages ($V_n$) of the divided blocks.

2. The method of controlling charge or discharge of the battery according to claim 1, wherein said controlling step includes the steps of:

setting a specified charge or discharge value ($V_{Kc}, V_{Kd}$);

comparing the obtained difference ($V_{max}-V_{min}$) in voltage between the maximum and minimum values ($V_{max}, V_{min}$) of the terminal voltages ($V_n$) with the set charge or discharge specified value ($V_{Kc}, V_{Kd}$); and stopping the battery from being further charged or discharged, when the obtained difference ($V_{max}-V_{min}$) in voltage between the maximum and minimum values ($V_{max}, V_{min}$) is equal to or larger than the set specified charge or discharge value ($V_{Kc}, V_{Kd}$).

3. The method of controlling charge or discharge of the battery according to claim 1, wherein said controlling step includes the step of:

limiting charge or discharge current supplied to the battery, according to the difference ($V_{max}-V_{min}$) between the maximum and minimum voltages ($V_{max}, V_{min}$) of the respective blocks of the battery (4).

4. The method of controlling charge or discharge of the battery according to claim 3, wherein said limiting step includes the step of:

determining a charge or discharge limit value ($\Delta I_c, \Delta I_d$) of the battery, with reference to a map representative of relationship between the charge or discharge current limit value ($\Delta I_c, \Delta I_d$) and the obtained difference ($V_{max}-V_{min}$) in voltage between the maximum and minimum values ($V_{max}, V_{min}$); and decreasing the charge or discharge current so that the current is equal to or smaller than the determined charge or discharge current limit value ($\Delta I_c, \Delta I_d$).

5. The method of controlling charge or discharge of the battery according to claim 1, further comprising the steps of:

detecting temperatures ($T_n$) of the divided blocks; and correcting the detected terminal voltages ($V_n$) of the divided blocks on the basis of temperature coefficients ($K_T$) determined according to detected temperatures of the divided blocks to obtain temperature corrected terminal voltages ($V_{Tn}=V_n \cdot K_T$).

6. The method of controlling charge or discharge of the battery according to claim 5, wherein said controlling step includes the steps of:

setting a specified charge or discharge value ($V_{KTc}, V_{KTd}$);

comparing the obtained difference ($V_{Tmax}-V_{Tmin}$) in voltage between the maximum and minimum values ($V_{Tmax}, V_{Tmin}$) of the terminal voltages ($V_{Tn}$) with the set charge or discharge specified value ($V_{KTc}, V_{KTd}$); and stopping the battery from being further charged or discharged, when the obtained difference ($V_{KTc}, V_{KTd}$) in voltage between the maximum and minimum values ($V_{Tmax}, V_{Tmin}$) is equal to or larger than the set specified charge or discharge value ($V_{KTc}, V_{KTd}$).

7. The method of controlling charge or discharge of the battery according to claim 5, wherein said controlling step includes the step of:

limiting charge or discharge current supplied to the battery, according to the difference ($V_{Tmax}-V_{Tmin}$) between the maximum and minimum voltages ($V_{Tmax}, V_{Tmin}$) of the respective blocks of the battery.

8. The method of controlling charge or discharge of the battery according to claim 7, wherein said limiting step includes the step of:

determining a charge or discharge limit value ($\Delta I_c, \Delta I_d$) of the battery, with reference to a map representative of relationship between the charge or discharge current limit value ($\Delta I_c, \Delta I_d$) and the obtained difference ($V_{Tmax}-V_{Tmin}$) in voltage between the maximum and minimum values ($V_{Tmax}, V_{Tmin}$); and decreasing the charge or discharge current so that the current is equal to or smaller than the determined charge or discharge current limit value ($\Delta I_c, \Delta I_d$).

* * * * *